Sept. 19, 1967 G. E. GATTNER ET AL 3,342,940

ARRANGEMENT FOR REGISTERING CALL METERING IMPULSES IN A COMMUNICATION SYSTEM

Filed Dec. 30, 1963 3 Sheets-Sheet 1

United States Patent Office 3,342,940
Patented Sept. 19, 1967

3,342,940
ARRANGEMENT FOR REGISTERING CALL METERING IMPULSES IN A COMMUNICATION SYSTEM

Günther E. Gattner and Karl-Heinz Widdel, Munich, Germany, assignors to Siemens & Halske Aktiengesellschaft, Berlin and Munich, Germany, a corporation of Germany Filed Dec. 30, 1963, Ser. No. 334,356
Claims priority, application Germany, Jan. 2, 1963, S 83,134
16 Claims. (Cl. 179—9)

The invention disclosed herein relates to the metering of calls in communication systems and is particularly concerned with an arrangement, in a central exchange, for seizing signal impulses appearing at random sequence upon communication lines, especially signal impulses for charging calls in telephone systems.

It is known to sample individual signal lines continuously in cyclic sequence for the purpose of seizing signal impulses, for example, impulses for the charging of calls in telephone systems, appearing in random sequence but with a definite temporal minimum spacing upon communication lines extending by way of connection devices such as selectors. This sampling is generally effected with the aid of coincidence gates, for example, diode gates, which are successively placed in operation. Coincidence of a sampling pulse with a signal impulse produces a control pulse which is extended to a recording or registering device.

All signal lines must be sampled once within the duration of the shortest signal impulse, in order to assure that all signal impulses are reliably seized. However, this calls for great operating speeds which in turn poses high requirements with respect to the mechanical construction of the equipment, especially in the case of drum storers, so that such arrangements become generally very expensive.

In order to reduce the required sampling speed, there is, according to another proposal, a binary storage element, for example, a ferro-magnetic ring core, assigned to each signal line, for temporarily storing incoming signal impulses, so that the duration of the respective signal impulse which is to be registered, is in simple manner prolonged beyond its inherent duration. Since such storage elements are unsuitable for counting, each such storage element must be read out by the time the next successive signal impulse is received, and the corresponding information must be recorded or registered at another place. The reading of the individual storage elements which are combined in the form of a matrix is effected periodically in a temporal sequence which is shorter than the spacing in time between two successive signal impulses, the storage element being at the same time reset to normal condition and the control signal obtained forming the criterion for the registering of a signal impulse.

The registration of the individual signal impulses may be effected by conducting to an automatically readable recording carrier the count condition of the sampling device, instead of conducting thereto a signal impulse, or, in the case of a storage arrangement having storage sections assigned respectively to individual signal lines, by releasing depending upon the position of the sampling device, the information contained in said storage sections which information is individual to signal lines, and thereupon storing the respective released information again, in changed or in unchanged form, depending upon the presence of a control signal. The change with respect to the information may consist, for example, in adding thereto the digit "1."

It is according to another method also known to arrange the storage elements in the respective connection devices which are directly connectible with individual subscriber lines, for example, in the case of telephone systems, in the connection device forming part of the first group selection stage, and to read out the corresponding storage elements arranged in such connection devices. The sampling speed required for the seizure of signal impulses occurring can be further reduced, since the number of such connection devices is smaller than the number of signal lines which are to be supervised. However, as contrasted with the previously mentioned methods, there is no fixed allocation between the connection devices which are to be sampled and the signal lines which are connectible thereto, making it necessary to ascertain, in the case of each seized signal impulse, the signal line to which it is to be assigned. The signals appearing upon the sampling of the storage elements, which signals are to be registered, are therefore conducted, by way of the respectively connected signal line, to an identification device and the line number which is thereby determined is stored directly, instead of a signal impulse, or is utilized for the operative control of a corresponding storage section of a registering device.

The present invention is likewise concerned with an arrangement for seizing signal impulses occurring in random sequence but with a minimum spacing as to time, upon communication lines extending by way of connecting devices, for example, signal impulses given for call metering purposes, by repeated or periodical reading of the connecting devices which are connected with communication lines to be supervised, the reading taking place with the aid of reading switches individually assigned to the respective connecting devices, which reading switches are affected by the signal impulses, and employing an identification device and a central recording or registering device. The arrangement according to the invention avoids the additional time required for the identification of the individual subscriber lines upon the processing of a signal impulse, by identifying with the aid of the identification device the respectively connected communication line, upon seizure of a connecting device which is to be read out, and holding the identification result in a storage member assigned to the respectively seized connection device, for the duration of the seizure thereof, the line numbers which are in this manner stored being utilized for the operative control of the central registering device depending upon the presence of signal impulses ascertained in the reading, thus effecting the processing of the signal impulses.

The above indicated operation eliminates the time consuming allocation of the identification device incident to each occurring signal impulse. The respective line number is available already at the instant at which the corresponding connection device is seized and can upon appearance of accounting impulse be utilized directly for the operative control of the central registering device.

The arrangement according to the invention is particularly advantageous in connection with centrally controlled communication systems, since the individual line number storers are for each connection path already available therein.

The operative control of the central registering device, by the stored line numbers, may be effected, for example, by directly operatively controlling the actuation of the reading switches which are allocated to the connection devices which are to be read and which are affected by the signal impulses to be registered, the register signals which are thereby obtained being operative to release the respective stored line number for the actuation of the central registering device. Another possibility resides in cyclically successively offering the line numbers which are present in a register containing all available line numbers, to all individual number storers in parallel, by way of comparers which are individually assigned thereto, the signal appearing at the output of the comparer upon coincidence of an offered line number with a stored line number, acting upon the reading switching or circuit member which is disposed in the corresponding connection device and being upon the presence of a signal impulse effective to cause the registering by the central registering device depending upon the line number standing in the number register.

The recording or registering of the signal impulse marked by the line number can be effected either by registering the line number instead of the counting impulse or operatively directly controlling the storer section of the registering device, which is individual to the line, and effecting an alteration with respect to the corresponding information.

The foregoing and further details and features of the invention will appear from the appended claims and from the description thereof which is rendered below with reference to the accompanying drawing.

Figure 8:
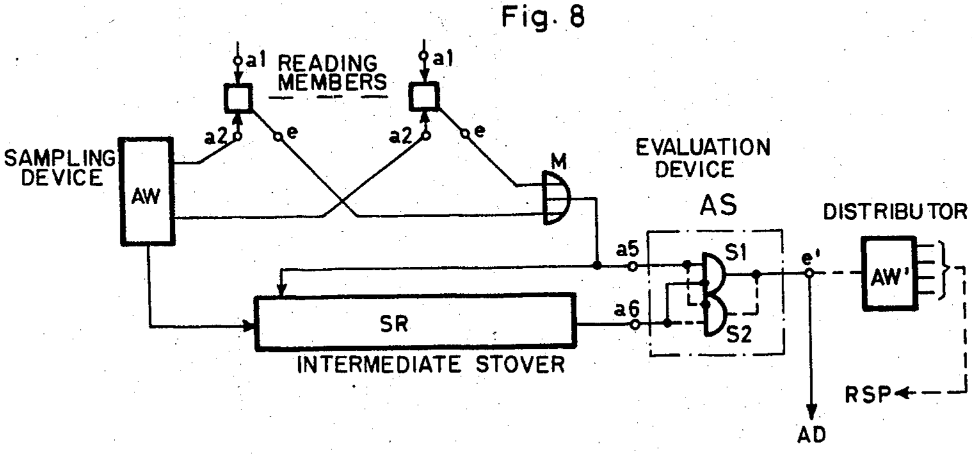

FIGS. 3 to 7 indicate embodiments of reading members assigned to the connecting devices and FIGS. 3*a* to 7*a* illustrate the respective corresponding pulse relationships thereof; and FIG. 8 shows a circuit illustrating the principles employed for the sampling of the reading members according to the "Last Look" principle.

Figure 1:
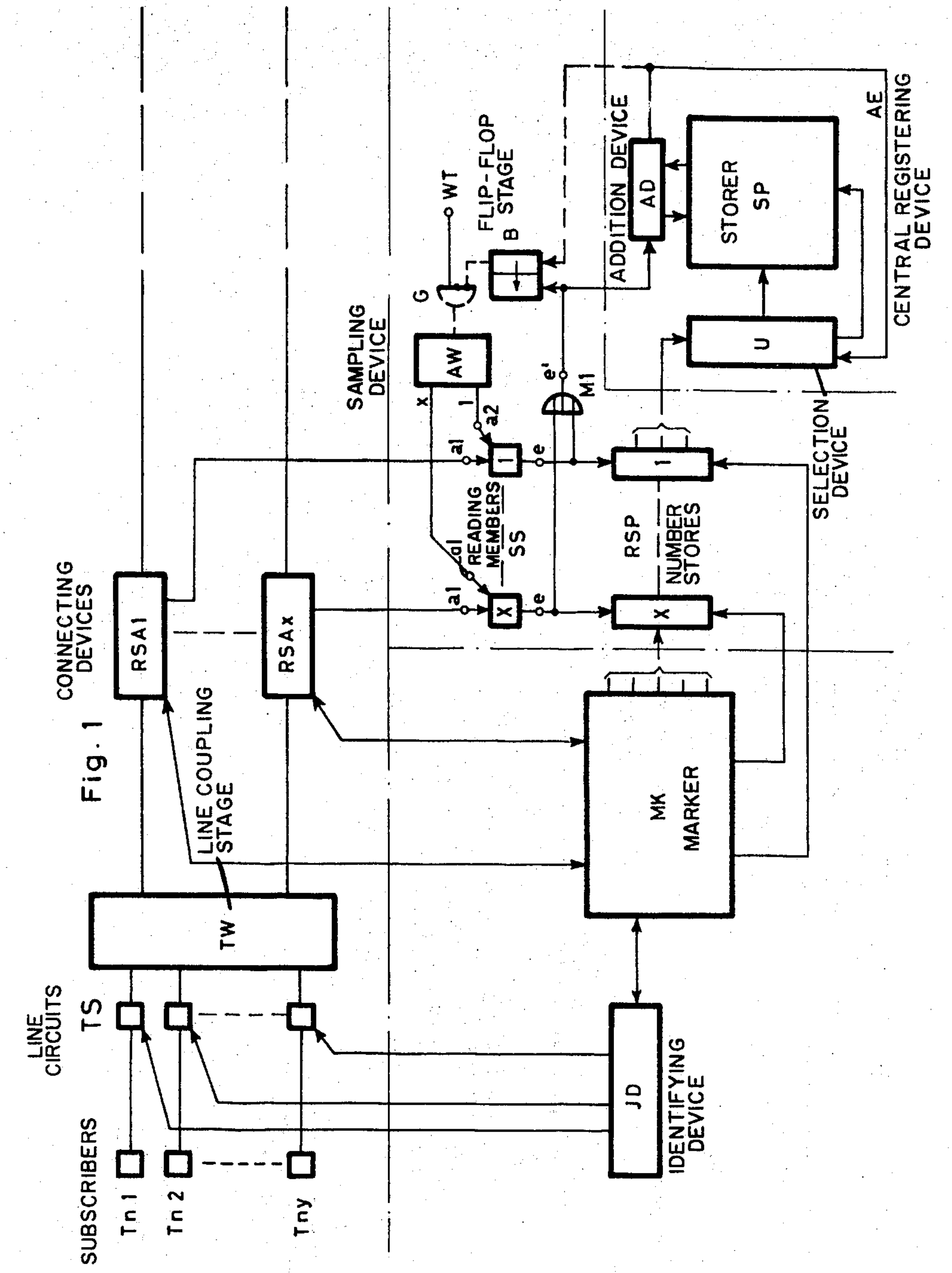
FIG. 1 shows in block diagram manner an arrangement illustrating the underlying principles employed in realizing the invention in connection with the metering of calls in a telephone system, wherein the number storers are operatively controlled with the aid of reading members.

FIG. 1 shows in the upper portion thereof subscriber stations T*n*1 to T*ny* with the respective line circuits TS which have by way of the line coupling stage TW access in known manner, by way of call finders or preselectors, to connection devices adapted to extend calls, for example to one of the relay sets RSA1 to RSA*x* of the first group selection stage. In the left lower portion of the figure are shown the indentification device JD and the marker MK, it being assumed that the system under consideration is a centrally controlled system, and in the right lower portion of the figure are shown the parts serving for the call metering. These parts include the reading members SS1 and SS*x*, which are individually assigned to respective connection devices, that is, to a respective relay set such as RSA1 or RSA*x*. There are also provided number storers RSP1 to RSP*x* which are respectively individual to the corresponding reading members. Upon seizure of a relay set, the number of the corresponding subscriber line is stored in a respective number storer by the action of the marker MK.

The reading members or switches SS are by means of the sampling device AW continuously sampled for the appearance of a counting impulse which acts upon the input *a*1. The register signals which thereby appear at the output *e* effect release from the involved number storer RSP of the numbers stored therein and extension thereof to the central registering device AE.

In the illustrated example, the registering device comprises a storage arrangement S*p* having storage sections which are individual to the respective subscriber lines, such storage sections containing as information the total number of counting or metering impulses appearing in case of a respective subscriber line. The individual storage sections are selected by the selection switch U depending upon the call number received. Upon actuation of the selection switch U, the information of the selected storage section is extended to the addition stage AD which increases the information received by "1," the altered information being stored again at the original place. As soon as the alteration of the information is concluded, the selection switch U is again activated and the central registering device is released for the processing of a subsequently ascertained metering impulse.

The sampling device AW can in known manner operate continuously or only responsive to a demand signal when required, for example, in response to the seizure of a connection device. There is in either case the possibility of stepping the sampling device ahead either in accordance with the processing speed of the central registering device or with a speed which is higher than the processing speed, and to stop it upon appearance of a register signal for the duration of the processing of the information.

The last noted possibility is indicated in FIG. 1 in dash lines. Upon appearance of a register signal at the output of the mixing gate M1, the bistable flip-flop stage B is switched into the working position, a blocking or barrier potential becoming operative at the control input of the blocking gate G, thereby preventing the further stepping of the sampling device AW by impulses extended to the terminal WT. The flip-flop stage B is switched to normal position, thereby removing the blocking potential at the blocking gate G, only upon restoration of the selection switch U by the action of the addition stage AD after the re-storing of the changed information is effected.

The construction of the reading members SS may be as desired and may be determined primarily by the number of the signal lines which are to be supervised, the number of counting or metering impulses to be processed per time unit, and by the impulse-pause ratio.

Figure 3:
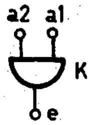
Figure 3A:
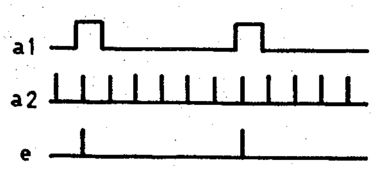

A coincidence gate K as shown in FIG. 3 would be feasible in the simplest case, such gate giving off an impulse at its output *e* only responsive to simultaneous appearance of signals at its imputs *a*1 and *a*2. Accordingly, in order to reliably seize all metering impulses occurring, all signal lines have to be sampled within the time of duration of the shortest metering impulse.

Figure 4:
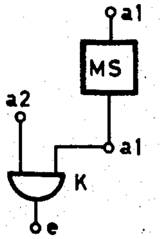
Figure 4A:
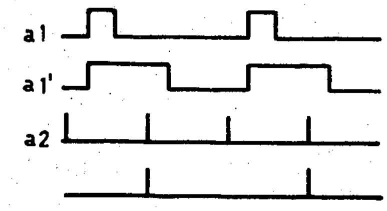

The sampling speed depending upon the shortest metering impulse duration can be shortened by an arrangement as shown in FIG. 4, wherein the metering impulses are conducted to the coincidence gate K by way of a monostable switching member MS which prolongs the signal impulses occurring to a predetermined duration.

Figure 5:
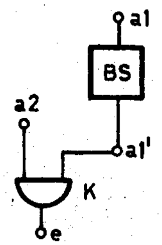
Figure 5A:
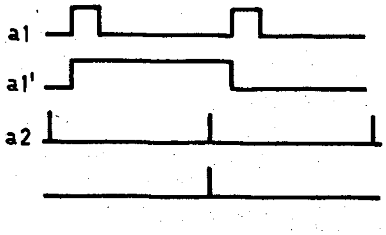

Upon using in place of the monostable switching member MS of FIG. 4, a bistable chatter-free switching member BS, as shown in FIG. 5, which member BS is by the action of the controlling metering impulse alternately switched from one to the other operating condition, the greatest permissible impulse sequence time of the sampling pulses will correspond to the impulse sequence time of the metering impulses appearing with minimum spacing, which also forms at the same time the absolute limit. The controlling metering impulse loses by the action of the bistable switching member its impulse character and is reduced at the output *a*1 to a single alteration of the signal condition.

Figure 6:
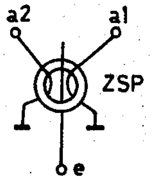
Figure 6A:
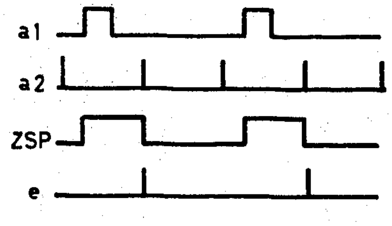

FIG. 6 shows the use of a known ferrite core as a binary storage element ZSP which is by the action of a metering impulse brought into the storing condition and thereupon again returned to its initial position by the action of the successive sampling pulse which occurs in the pause between two metering impulses. Accordingly, the greatest permissible impulse sequence time for the sampling pulses is determined by the minimum pause spacing, since the storage element must be in its initial position prior to the appearance of the successive metering impulse.

Figure 7:
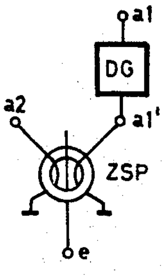
Figure 7A:
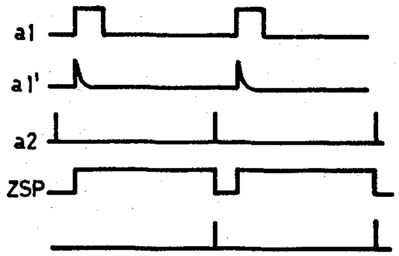

Permissible impulse sequence times for the sampling pulses, as in the embodiment shown in FIG. 4, can be obtained with the use of the arrangement shown in FIG. 7, by conducting the metering impulses to the storage element not directly by way of a differentiating member DG of known type.

Considerably more favorable time conditions are obtained by the use of multistable storage elements, for example, ferromagnetic ring cores or counting chains which deliver upon the sampling thereof, a register criterion, for example, after each tenth metering impulse. However, there is additionally required a transmission of the intermediately stored remaining metering impulses, depending upon the termination of a call, as has been proposed in connection with another method.

Figure 2:
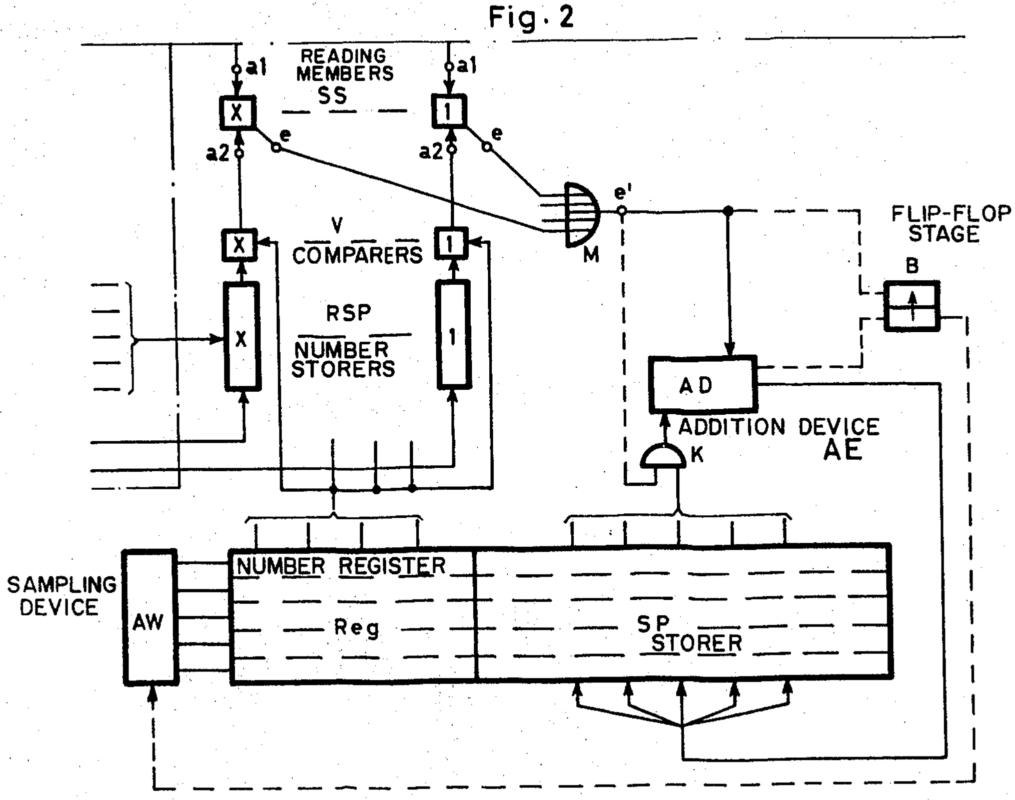
FIG. 2 represents in similar manner an arrangement wherein the number storers are operatively controlled by a central address register.

FIG. 2 shows in a manner similar to FIG. 1 an embodiment wherein the sampling of the individual reading members SS is controlled by a number register which contains all line numbers. This number register is appropriately combined with the storer SP of the registering device AE, to form a storage device therewith, wherein the through-connection of a given call number from the register R*eg* effects by the action of the sampling device AW, operative control of the respectively involved storage unit of the storer SP. The call numbers contained in the number register R*eg* are cyclically successively offered to the call number storers RSP1 . . . RSP*x* in parallel, by way of comparers V1 . . . V*x* which are respectively individual thereto. In the event that the offered call number coincides with the call number contained in the corresponding number storer RSP, there will appear at the output of the involved comparer, for example, VI, a reading signal which affects by way of the input *a*2, the associated reading switching member, for example, SS1, causing in the presence of a metering impulse appearance of a registering signal at the output *e*. This registering signal is by way of the mixing gate M conducted to the addition stage AD which changes the corresponding information in known manner and effects the re-storing thereof.

The coincidence gate K operates so that the information of the respectively operatively controlled storage unit in the central storer SP is transferred to the addition stage AD only when an information change is actually to be effected.

The reading members SS can in this embodiment likewise be sampled with a speed which is higher as compared with the processing speed of the central registering device AE. The stopping of the sampling device AW, in the presence of a register signal, and the release thereof after the processing of the ascertained metering impulse, is effected as described in connection with FIG. 1 and the respective control lines for such operation are as in FIG. 1 indicated in dash lines.

FIG. 8 shows in a manner similar to the representation of the two embodiments according to FIGS. 1 and 2, a modification with respect to the operative control of the central registering device AE, upon using a sampling procedure operating in accordance with the "Last Look" principle, as it is required, for example, when using the reading members SS shown in FIGS. 3 to 5 and in a given case according to FIG. 6. It must be considered in this connection that only the transition from one signal condition, for example, "0," to the other signal condition, for example, "1," is evaluated as a register signal, thus avoiding plural counting of one and the same metering impulse. This transition is in simple manner determined according to the "Last Look" principle, by comparing each reading result directly with the preceding reading result. Each reading result is therefore intermediately stored for the duration of a reading cycle and is at the same time conducted jointly with the successive reading result of the same reading cycle, to an evaluation switching member which determines the instant at which a registering is to be effected by the central device. In accordance with FIG. 8, each reading signal appearing at the output *e* of the reading member SS is by way of a mixing gate M conducted to the evaluation switching member AS and to the intermediate storer SR which may be constructed as a time (delay) member or as a shift register. Upon conclusion of a full sampling cycle, there will appear at the two inputs *a*5 and *a*6 of the evaluation member AS respectively two successive reading results of the same reading member, for example, SS1.

Upon using reading members according to FIG. 3 or FIG. 4, the evaluation member AS may be constructed as a simple blocking gate S1 which as is known delivers a signal at the output only when the two input signals are in a given combination dissimilar. However, an auxiliary blocking gate S2 is required when using the reading member according to FIG. 5 which produces a register signal incident to each change of condition.

Applied to the embodiment shown in FIG. 2, the arrangement according to FIG. 8 would have to be inserted between the outputs *e* of the reading members SS1 to SS*x* and the output *e'* of the mixing gate M.

A change is required in the arrangement according to FIG. 1, inasmuch as the call number storers RSP1 to RSP*x* cannot anymore be directly operatively controlled from the outputs *e* of the respectively associated reading members SS1 to SS*x*, because each reading signal does not effect a recording. The call number storers RSP are to be extended to the selection switch U only in the presence of a registering signal. However, since there is no direct spatial allocation anymore between the register signals appearing at the output *e'* of the evaluation member AS and the individual reading members SS or the associated number storers RSP, respectively, a distributor device AW' operating synchronously with the sampling device AW, is to be inserted between the output *e'* of the evaluation member AS and the control inputs of the individual call number storers RSP1 to RSP*x*, such distributor device transferring the register signals appearing in a time multiple again into a spatial multiple.

The realization of the structural components, for example, the sampling device AW, the stores RSP, R*eg* and SP, the addition stage AD, and the like, is not inherently limited to definite forms of construction. Any known and suitable embodiments may be used so long as they satisfy the functions required by the invention as described and claimed herein. Detailed explanations with respect to the individual component groups are therefore omitted.

Changes may be made within the scope and spirit of the appended claims which define what is believed to be new and desired to have protected by Letters Patent.

We claim:

1. An arrangement for the registering, on telecommunication lines with interposed connecting devices such as the first group selector, signal pulses allocated to one of a plurality of such lines, such as charge pulses in telephone installations, in which the signal pulses appear in random sequence but with definite temporal minimum spacing, and for storing an indication of such signal pulses in a central registering device as a signal allocated to the appropriate line, through repeated or periodic reading of the connecting devices connected with the lines to be monitored by reading members responsive to the signal pulses, individually appearing thereat, comprising an identifying device, individual storers for the respective connecting devices operatively connected to respective reading members and said identifying device, for receipt, at the beginning of a connection build-up, of the call number of the subscriber building up the connection, as ascertained by said identifying device, the central registering device having a storer and a control device responsive to a signal pulse thereat, in conjunction with the number stored in said individual storers to initiate storage in the central storer of said central registering of an indication of such a signal pulse as a signal allocated to the appropriate line, and thereby effect the registering thereof.

2. An arrangement according to claim 1, comprising a coupling device operatively connected to said reading members for directly controlling the latter, the outputs of said reading members being operatively connected to said storers to effect a release of the stored contents thereof in the presence of a control signal at said outputs.

3. An arrangement according to claim 1, comprising a register containing the numbers of all lines which may be involved in calls, said individual storers being in the form of number storers, a comparer cooperating with each number storer, means for cyclically successive presentng the line numbers contained in said register, to all number storers in parallel by way of the comparers respectively cooperating therewith, a signal appearing at the output of a respective comparer upon coincidence of an offered line number with a stored line number, means for causing said signal to operatively affect as a reading signal the reading member of the respective connecting device and for causing in the presence of a metering signal impulse registration thereof by the central recording device depending upon the line numbers contained in said register.

4. An arrangement according to claim 3, wherein the central number containing register and the storer of the central registering device are combined into one storage device.

5. An arrangement according to claim 4, wherein said last named storage device is a rotating magnetic layer storer.

6. An arrangement according to claim 1, for use in a system employing a sampling procedure according to which the signal to be registered and which operatively releases the registering, is derived from two successive reading results, for instance upon determination of the transition from one signal condition "0" to another signal condition "1," comprising a timing delay member to which the reading results appearing at the output of the reading member are conducted, the reading results appearing at the output of the delay member being delayed by a full sampling cycle, an evaluation member connected to receive the output of said delay member and the successive reading results which are respectively in phase, effective to control the operation of an evaluation member, the latter being operable to control the central registering device in dependence upon the two reading results.

7. An arrangement according to claim 6, wherein the individual reading members are so arranged that operative actuation thereof is effected periodically in accordance with the processing speed of the central registering device.

8. An arrangement according to claim 6, wherein the individual reading members are so arranged that operative actuation thereof is effected cyclically with a speed which exceeds the speed of operation of the central registering device, and means for stopping the sampling operation upon appearance of a signal to be registered, for the duration of the registering thereof.

9. An arrangement according to claim 8, comprising means for effecting the operative actuation of the individual reading members upon seizure of a connecting device which is to be read.

10. An arrangement according to claim 6, wherein the individual storers are so arranged that the operative actuation thereof is effected periodically in accordance with the processing speed of the central registering device.

11. An arrangement according to claim 8 comprising means for effecting the operative actuation of the individual storers upon seizure of a connecting device which is to be read.

12. An arrangement according to claim 6, wherein the individual storers are so arranged that operative actuation thereof is effected cyclically with a speed which exceeds the speed of operation of the central registering device, and means for stopping the sampling operation upon appearance of a signal to be registered, for the duration of the registering thereof.

13. An arrangement according to claim 1, wherein the reading members are individual to the respective connection devices, the respective reading members being combined in the form of a matrix.

14. An arrangement according to claim 13, wherein said reading members comprise binary storage elements such as ferromagnetic ring cores, such elements being combined with the individual number storers to form a storage device therewith.

15. An arrangement according to claim 1, wherein said individual storers are in the form of number storers and the control device of the central registering device is coupled with the individual number storers, and is constructed as a marking device whereby the direct recording to the numbers is effected in said central storer.

16. An arrangement according to claim 1, wherein said individual storers are in the form of number storers, the control device of the central registering device coupled with the individual number storers being constructed as a selecting device for effecting a reading out and storing back of the total number contained in the corresponding storage sections of the central storer of the registering device, and means for effecting a change in the stored signal prior to the restoring thereof.

References Cited

UNITED STATES PATENTS

| | | | |
|---|---|---|---|
| 2,782,256 | 2/1957 | Malthaner | 178—7.1 |
| 2,849,535 | 8/1958 | Baker et al. | 179—7.1 |
| 2,979,569 | 4/1961 | Kosten | 179—7.1 |
| 3,222,457 | 12/1965 | Ambrosino | 179—9 |

KATHLEEN H. CLAFFY, *Primary Examiner.*

H. ZELLER, *Assistant Examiner.*